March 9, 1926.  1,576,156
A. P. SWOBODA
METHOD OF PERMANENTLY MARKING TIRE CASINGS
Original Filed Dec. 24, 1919

Inventor
Alois P. Swoboda

Witness:
GHWagner,

By Ross, Ross & Still
Attorneys

Patented Mar. 9, 1926.

1,576,156

UNITED STATES PATENT OFFICE.

ALOIS P. SWOBODA, OF NEW YORK, N. Y.

METHOD OF PERMANENTLY MARKING TIRE CASINGS.

Original application filed December 24, 1919, Serial No. 347,056. Divided and this application filed May 26, 1923. Serial No. 641,785.

*To all whom it may concern:*

Be it known that I, ALOIS P. SWOBODA, a citizen of the United States, residing at New York, in the county of New York and State of New York, have invented certain new and useful Improvements in Methods of Permanently Marking Tire Casings, of which the following is a specification.

The present invention relates to a novel method of providing a tire casing or like article with an individual identification character, which may either be used for trade-mark purposes or formed and arranged in such a manner as to be of material assistance in detecting and locating stolen tires and vehicles.

According to the present invention it is contemplated to provide a rubber vehicle tire with a distinctive character which is formed in such a manner that it cannot be removed without leaving unmistakable signs of mutilation, and which can be readily seen by any passerby when the automobile is standing, or when it stops at a supply station for air, fuel or oil. The tire is thus marked in such a manner that identification will be easy, and the mark may either be in the form of a name or trade-mark, or in the form of an individual identification character which will act as a form of insurance against theft of the tire itself or the vehicle upon which the tire is placed, since it will render identification and recovery of the tire, if stolen, comparatively simple.

The invention contemplates a novel method of providing a rubber vehicle tire or like article with a distinctive mark of this character, and this application is a division of a co-pending application for an identification means for tires and wheels which was filed on December 24, 1919, Serial No. 347,056.

For a full understanding of the process and the manner in which it is performed reference is to be had to the following description and accompanying drawings, in which—

Referring specifically to the drawings the numeral 1 designates the body or carcass of the tire which is formed in the usual manner of rubber and fabric, certain of the fabric thicknesses being indicated at 2. The sides of the tire are provided with any desired marks, lettering or data, such as that indicated at 3, and may also be provided in addition with large and conspicuously displayed identification characters. The identification characters may be of any suitable type, being shown in the present instance as including a serial number 4, a letter 5, and an arbitrary sign or symbol 6. These identification characters are preferably sufficiently large to be easily read at a glance, although they may be of any desired distinctive design and may be of any desired size.

Figure 1:
Figure 1 is a side elevation of a portion of a vehicle tire which is formed with distinctive characters or marks, formed in accordance with the present invention, the body of the tire being white while the identification characters are red in color.
Figure 2:
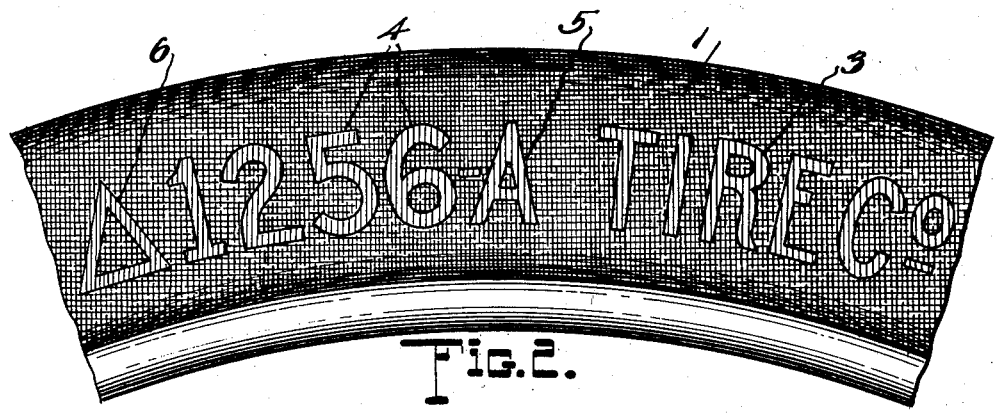
Figure 2 is a similar view in which the body of the tire is black and the identification characters red in color.
Figure 3:
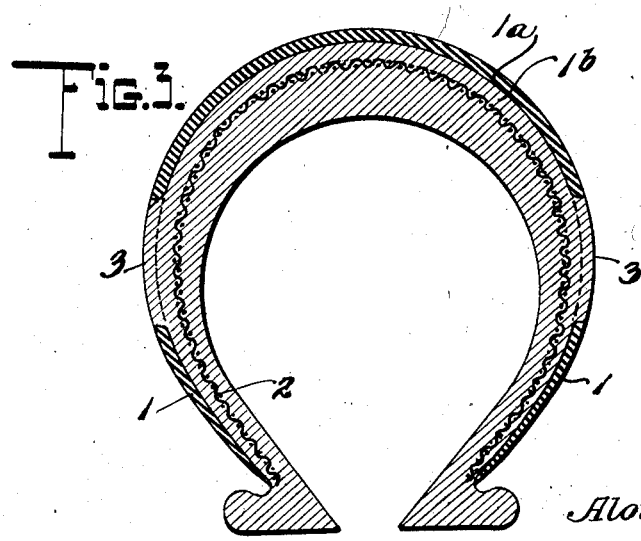
Figure 3 is a transverse sectional view through the tire, showing the manner in which the characters are formed, by causing a portion of an inner thickness of rubber to project into the zone of a superposed thickness of rubber having a different color and be exposed therethrough.

The characters are of a color different from that of the tire carcass, so that the contrast of colors will enable the characters to be easily read. In Figure 1 the body of the tire is indicated as having the usual gray or white color, while the identification characters are red. In Figure 2 the same reference numerals refer to similar parts or features, although the color scheme is different. the body of the tire being black, while the identification characters are red. The distinctive coloring of the characters is due to the coloring of the rubber itself, and all of the rubber parts are cured or vulcanized together, so that they form an integral and essential part of the rubber body of the tire. These characters are conspicuously displayed on the side of the tire, so that they can be seen or read at a glance without difficulty, and they are formed in such a manner that it is impossible to remove or efface them without leaving unmistakable evidence of mutilation.

The identification marks or characters may be of any desired form or design, and they are made a permanent part of the tire by means of the process which is described and claimed in this application. In forming the tire the distinctive marks or characters are cut in an outer thickness $1^a$ of uncured rubber which is superposed upon an inner rubber thickness 1ᵇ of uncured rubber having a different color from that of the outer thickness 1ᵇ. After the carcass has thus been built up it is cured or vulcanized in the usual manner. This may be conveniently done by placing the carcass in an ordinary mold and subjecting it to pressure in the usual manner during the period of vulcanization. In the curing of the tire the rubber of the inner thickness 1ᵇ may be caused to protrude into and fill the openings in the outer thickness 1ᵇ of rubber, thereby leaving the outer surface of the tire substantially flush, although the members or characters stand out in bold relief owing to the difference in the color of the rubber.

The process can be used either for applying a distinctive character such as a trademark or trade-name to a tire, or for applying an individual identification character for the purpose of rendering the tire less liable to be stolen than an ordinary tire not so marked.

It will be obvious that a tire manufactured by this process will have great value to the manufacturer as an advertising medium, since it will enable his products to be distinguished at a glance from the similar products of another manufacturer.

As has been previously stated, this application is a division of a co-pending application which was filed December 24, 1919, Serial No. 347,056. The claims of the co-pending application are directed to the product or tire itself, while the claims of this application are directed to the method or process of making the tire.

While I have described one particular means of carrying out the process in detail, I do not wish to restrict myself to the exact details disclosed, since variations and modifications are possible without departing from the spirit of the invention.

Having thus described my invention what I claim as new and desire to secure by Letters Patent is,

1. The method of producing a tire casing having a distinctive character thereon which is of a color contrasting with the color of the casing, said method consisting of building up a tire carcass with independent and superposed thicknesses of unvulcanized rubber which extend substantially around the entire periphery of the carcass, and vulcanizing the tire carcass whereby the two superposed thicknesses of differently colored rubber are joined together in a homogeneous mass, portions of the outer thickness of rubber being removed to provide openings of distinctive configurations through which corresponding portions of the inner thickness of rubber are displayed.

2. The method of producing a tire casing having a distinctive character thereon which is of a color contrasting with the color of the casing, said method consisting of building up a tire carcass with superposed thicknesses of unvulcanized rubber which have contrasting colors and extend around substantially the entire periphery of the carcass, vulcanizing the tire carcass whereby the two superposed thicknesses are joined together in a homogeneous rubber mass, and simultaneously with the vulcanization permitting portions of the inner thickness of rubber to protrude into the plane of the outer thickness, said protruding portions having the shape of the desired distinctive character, and corresponding openings being formed in the outer thickness of material to receive the protruding portions of the inner thickness and permit the same to be displayed.

3. The method of producing a tire casing having a distinctive character thereon which is of a color contrasting with the color of the casing, asid method consisting of building up a tire carcass with superposed thicknesses of unvulcanized rubber having contrasting colors, vulcanizing the tire carcass whereby the superposed thicknesses of rubber are joined together in a homogeneous rubber mass, simultaneously with the vulcanization causing portions of the inner thickness to protrude into the plane of the outer thickness, and providing means for causing said protruding portions to have a desired configuration, said protruding portions being visible through corresponding openings in the outer thickness.

In testimony whereof I affix my signature.

ALOIS P. SWOBODA.